US012430521B2

United States Patent
Vaught et al.

(10) Patent No.: US 12,430,521 B2
(45) Date of Patent: Sep. 30, 2025

(54) ERROR CORRECTION USING COMBINATION RFID SIGNALS

(71) Applicant: Walmart Apollo, LLC, Bentonville, AR (US)

(72) Inventors: Sara Vaught, Centerton, AR (US); Jeffrey S. Cruz, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 128 days.

(21) Appl. No.: 17/708,651

(22) Filed: Mar. 30, 2022

(65) Prior Publication Data

US 2022/0318529 A1 Oct. 6, 2022

Related U.S. Application Data

(60) Provisional application No. 63/168,756, filed on Mar. 31, 2021.

(51) Int. Cl.
*G06K 7/10* (2006.01)

(52) U.S. Cl.
CPC ............ *G06K 7/10297* (2013.01); *G06K 2007/10504* (2013.01)

(58) Field of Classification Search
CPC ..... G06K 7/10297; G06K 2007/10504; G06K 7/10415; H04W 4/80; H04W 4/02; G01S 13/46; G01S 13/75; G06Q 10/087
See application file for complete search history.

(56) References Cited

U.S. PATENT DOCUMENTS

| | | | |
|---|---|---|---|
| 7,046,141 B2 | 5/2006 | Pucci et al. | |
| 7,295,120 B2 | 11/2007 | Waldner et al. | |
| 8,421,627 B2 | 4/2013 | Rinkes | |
| 9,472,075 B1* | 10/2016 | Simon | G06K 7/0008 |
| 9,892,353 B1* | 2/2018 | Lui | H04W 4/029 |
| 11,727,224 B1* | 8/2023 | Maricic | G06Q 20/18 235/375 |
| 2007/0112461 A1* | 5/2007 | Zini | G05D 1/028 700/245 |
| 2010/0201520 A1 | 8/2010 | Stern et al. | |
| 2017/0063476 A1* | 3/2017 | Nair | G06K 7/10475 |
| 2018/0107969 A1* | 4/2018 | Trivelpiece | B25J 9/1679 |
| 2018/0293535 A1* | 10/2018 | Christopher | G06Q 10/087 |
| 2019/0325385 A1* | 10/2019 | Tingler | G06K 19/0723 |
| 2021/0046650 A1* | 2/2021 | Deyle | G05D 1/0214 |
| 2022/0245369 A1* | 8/2022 | Groomes | G06Q 10/087 |

\* cited by examiner

*Primary Examiner* — Sonji N Johnson
(74) *Attorney, Agent, or Firm* — Foley IP Law, PLLC (57) ABSTRACT

A system and method for error correction using radiofrequency identification (RFID) signals. The method includes analyzing one or more signal properties of received RFID tag data obtained from location tag(s) associated with one or more predetermined locations and item tag(s) associated with one or more items in the scan zone. The current location of the items is calculated based on the analyzed signal properties, such as, but not limited to, signal strength. If an item is located in the correct location, the assigned location of the item is verified. If the current location of the item differs from an expected location, the item location data for that item is updated with the current location of the item in a data store. Error correction data is generated, which can include updating the item location and/or providing instructions to move the item from the item's current location to the assigned item location.

12 Claims, 5 Drawing Sheets

ERROR CORRECTION USING COMBINATION RFID SIGNALS

BACKGROUND

Retail locations suffer from inaccuracies and inefficiencies when items are misplaced and not returned. In some instances, items can be placed in an incorrect location for extended periods of time because of on hand inaccuracies, display inaccuracies, and display locations. Current solutions, such as enabling and instructing sales associates to search for and correct the inaccuracies, remain insufficient and do not adequately address these issues.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Some examples provide a computer-implemented method for error correction using radiofrequency identification (RFID) signals. A set of signal properties are analyzed. The signal properties include one or more properties of the RFID tag data obtained from a plurality of RFID tags within a scan zone associated with at least one scanner. The RFID tags include a location tag associated with at least a portion of a display and a set of item tags associated with a set of items. A set of item tags that are within a threshold range of the location tag are identified based on the analyzed signal properties associated with the received RFID tag data. A set of items corresponding to the identified set of item tags are associated with a predetermined location assigned to the location tag. The location of the set of items is verified if the predetermined location matches the assigned location of the set of items. Item location data for the set of items is updated if the verification fails.

Other examples provide a system for error correction using radiofrequency identification (RFID) signals. The system includes a memory, an RFID scanner, and a processor communicatively coupled to the memory and configured to analyze signal properties of received radiofrequency identification (RFID) tag data received, by the RFID scanner, from a plurality of RFID tags. The plurality of RFID tags include a location tag associated with at least a portion of a display and a set of item tags associated with a set of items. A set of item tags within a threshold range of the location tag are identified based on the analyzed signal properties associated with the received RFID tag data. A set of items corresponding to the identified set of item tags are associated with a predetermined location assigned to the location tag. The predetermined location is verified if the expected location of the set of items corresponds to the predetermined location. The item location data for the set of items is updated if the predetermined location associated with the location tag does not correspond to the expected location of the set of items.

Other examples provide one or more non-transitory computer storage media having computer-executable instructions for error correction using radiofrequency identification (RFID) signals. The instructions, when executed by a processor, cause the processor to analyze signal properties of received radiofrequency identification (RFID) tag data received, by the RFID scanner, from a plurality of RFID tags. The plurality of RFID tags include a location tag associated with at least a portion of a display and a set of item tags associated with a set of items. The set of items tags within a threshold range of the location tag are identified using the analyzed signal properties associated with the received RFID tag data. A set of items corresponding to the identified set of item tags are associated with a predetermined location assigned to the location tag. The assigned item location for the set of items is verified if the assigned location is the same location as the predetermined location associated with the location tag. The location data describing the location of the set of items is updated within a data store if the predetermined location differs from the assigned location of the set of items.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Corresponding reference characters indicate corresponding parts throughout the drawings. In FIGS. 1 to 5, the systems are illustrated as schematic drawings. The drawings may not be to scale.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

As discussed herein, current solutions for solving incorrect product locations are inadequate. Item locations within a store are typically identified through manual inventory procedures such as physical search of shelving, visual inspection of items on the shelving and/or scans of items on the shelving which can be time-consuming, inefficient, inaccurate and costly. The inability to accurately locate items and/or correctly identify the current location of items in inventory can lead to overstock of items, understocking items, item outs, and lost sales due to customer inability to locate desired items, inaccurate inventory data, and/or suboptimal placement of items on a sales floor.

Accordingly, various examples of the present disclosure provide improved systems and methods for error correction using combination radiofrequency identification (RFID) signals. As described herein, these examples enable an association between items or products for sale and a particular location. Signal properties of RFID scans can be analyzed to determine whether item tags corresponding to the correct items are in the correct location, verifying the associations between the item tags and the location, and updating item location data when the associations cannot be properly verified.

Aspects of the disclosure further enable a location of items to be determined at an increased speed based on the use of an error correction component, thereby improving the functioning of the underlying computing device. The error correction component, which can be stored in the memory of a computing device, operates in an unconventional manner by using particular signal properties of RFID tag data, received from a RFID scanner, to identify items that are correctly located in a location and correct the location of items that are not correctly located. In this manner, the computing device is used in an unconventional way and allows item tags to be associated not only with an item, but with a particular location for displays and other areas within a retail environment.

Aspects of the disclosure further enable a reduced error rate of items in an improper location based on the use of an error correction component, thereby improving the functioning of the underlying computing device. The error correction component, which can be stored in the memory of a computing device, operates in an unconventional manner by making multi-faceted associations between item tags, items, location tags, and locations assigned to the item tags based on particular signal properties of received RFID tag data. In this manner, the error correction component is used in an unconventional way where it allows items to be identified in a particular location more efficiently, preventing incorrectly placed items from going undetected and uncorrected for extended periods of time.

Aspects of the disclosure further enable an improved user interface that enables automatic error correction of location data, thereby improving user efficiency and the functioning of the underlying computer device. The user interface of a device improves user efficiency by automatically providing a mechanism to correct errors in location data. Because of the improved user interface, errors in location data, such as items and item tags being placed at an incorrect location, can be detected and corrected in substantially real-time, rather than separating the process into two steps of data collection and error correction. In other words, the detected errors can be corrected as they are found, increasing the speed, efficiency, and accuracy of the error correction process. In this manner, the improved user interface, in combination with the error correction component enables rapid correction of errors found between item and location data.

Figure 1:
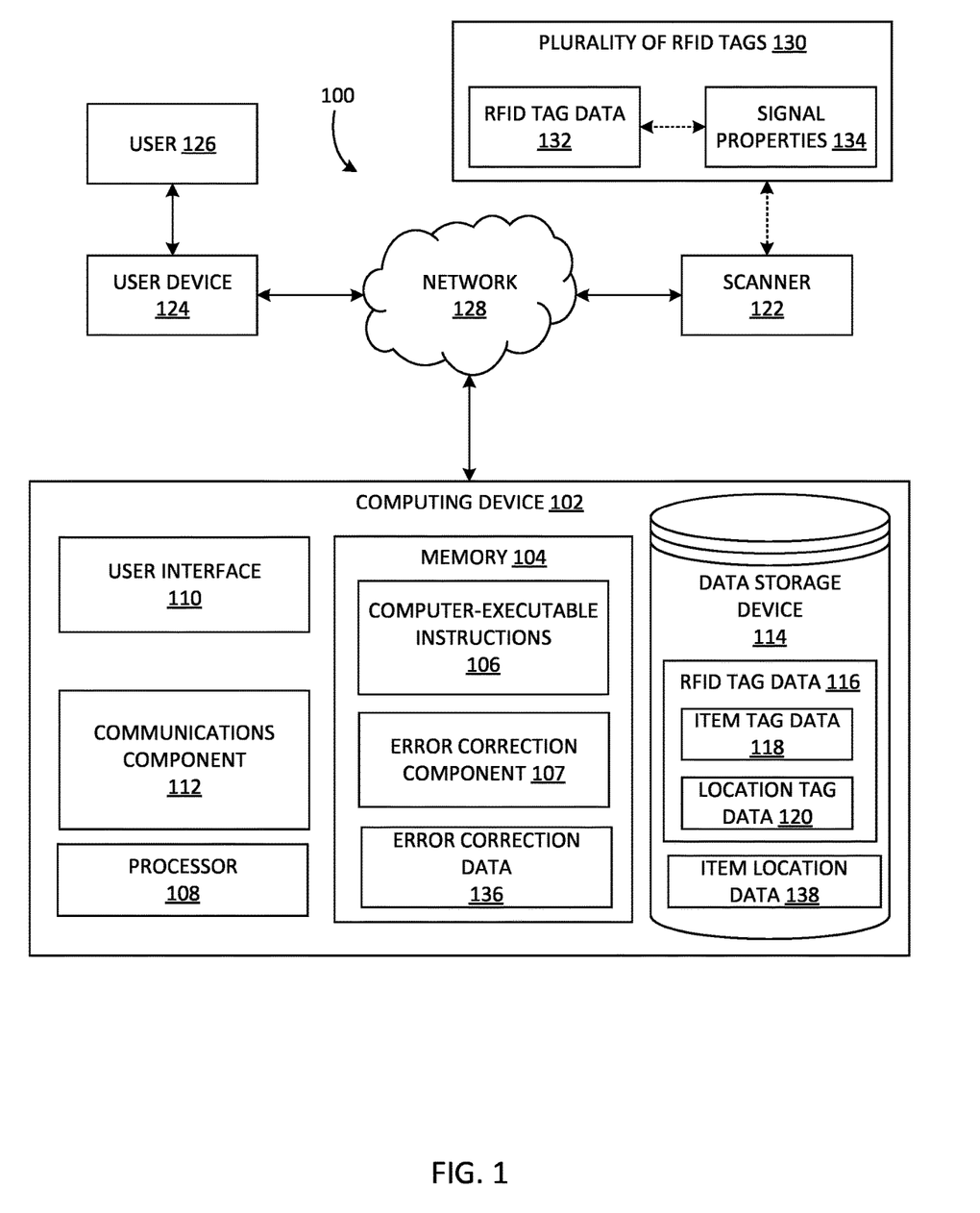
FIG. 1 is an exemplary a block diagram illustrating a system for error correction using combination radiofrequency identification (RFID) signals.

FIG. 1 is an exemplary a block diagram illustrating a system for error correction using combination radiofrequency identification (RFID) signals. The system 100 of FIG. 1 is for illustration purposes only. Other examples of the system 100 can be used without departing from the scope of the present disclosure.

FIG. 1 illustrates a computing device 102 that represents any device executing computer-executable instructions 106 (e.g., as application programs, operating system functionality, or both) to implement the operations and functionality associated with the computing device 102. In some examples, the computing device 102 is a server, desktop personal computer, kiosk, or tabletop device. In some examples, the computing device 102 is a mobile computing device or any other portable device. A mobile computing device can include, for example but without limitation, a mobile telephone, laptop, tablet, computing pad, netbook, gaming device, and/or portable media player. In some examples, the computing device 102 represents a group of processing units or other computing devices.

In some examples, the computing device 102 includes a memory 104, at least one processor 108, user interface 110, communications component 112, and data storage device 114. The processor 108 includes any quantity of processing units and is programmed to execute computer-executable instructions 106 stored in the memory 104. The computer-executable instructions 106 are performed by the processor 108, performed by multiple processors 108 within the computing device 102, or performed by a processor external to the computing device 102.

The memory 104 includes any quantity of media associated with or accessible by the computing device 102. In some examples, the memory 104 is internal to the computing device 102, as shown in FIG. 1. In other examples, the memory 104 is external to the computing device or both external and internal. The memory 104 can include read-only memory and/or memory wired into an analog computing device. The memory 104 stores data, such as one or more applications and/or the computer-executable instructions 106. The applications, when executed by the processor 108, operate to perform functionality on the computing device 102. The applications can communicate with counterpart applications or services, such as web services accessible via a network 128.

In some examples, the user interface 110 includes a graphics card for displaying data to a user, such as the user 126, and receiving data from the user 126. The user interface 110 can also include computer-executable instructions, for example a driver, for operating the graphics card. The user interface 110 can further include a display, for example a touch screen display or natural user interface, and/or computer-executable instructions, for example a driver, for operating the display. The user interface 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

In some examples, the user interface 110 is provided on a separate device, such as a handheld electronic device, a mobile electronic device, a tablet, a wearable electronic device, or a similar electronic device, and communicatively coupled to the computing device 102. In other examples, the user interface 110 is provided on the user device 124, the scanner 122, or coupled to the user device 124 or the scanner 122. The user interface 110 can display, in real time, the results output by the processor 108 executing the error correction component 107, as described in greater detail below, that verify the location for the scanned item tags, update the location for the scanned item tags, and/or issue an alert requesting corrective action to correct the location of the scanned item tag.

In some examples, the system 100 includes a communications component 112. The communications component 112 includes a network interface card and/or computer-executable instructions, for example a driver, for operating the network interface card. Communication between the computing device 102 and other devices, such as but not limited to a user device 124 and/or a scanner 122, can occur using any protocol or mechanism over any wired or wireless connection. In some examples, the communications component 112 is operable with short range communication technologies such as by using near-field communication (NFC) tags. In some examples, the communications component 112 includes a transceiver configured to transmit and receive signals, such as via the network 128.

The data storage device 114 is used to store data within the computing device 102. For example, the data storage device 114 can store RFID tag data 116, such as item tag data 118 associated with a set of items corresponding to the particular RFID tag data 116 and location tag data 120 associated with at least a portion of a display at the predetermined location. In particular, the location tag data 120 includes the predetermined location of a display within a scan zone at a predetermined location. In various examples, the scan zone can include all of or a portion of a storage area, a sales floor, a warehouse, a pick area, and so forth. These areas, such as the sales floor, can be further subdivided such that the scan zone can include a particular portion of a subdivided area. For example, a sales floor can be subdivided into a grocery area, a clothing area, an auto parts area, a garden center, and so forth. The scan zone can include an indoor area, an outdoor area, an area which is both indoor and outdoor, as well as an area which is partially enclosed. The scan zone can refer to an entire subdivided area or a portion of the subdivided area. For example, the scan zone can include a radius surrounding a rack, shelf, cubby, end-cap display, standalone display, tote, box, pallet, cart, buggy, and so forth that stores items in the subdivided area. The relationship between the RFID tag data 116, item tag data 118, and location tag data 120 will be described in greater detail below.

The data storage device 114 can include one or more different types of data storage devices, such as, for example, one or more rotating disks drives, one or more solid state drives (SSDs), and/or any other type of data storage device. The data storage device 114, in some non-limiting examples, includes a redundant array of independent disks (RAID) array. In other examples, the data storage device 114 includes a database. The data storage device 114, in this example, is included within the computing device 102, attached to the computing device, plugged into the computing device, or otherwise associated with the computing device 102. In other examples, the data storage device 114 includes a remote data storage accessed by the computing device via the network 128, such as a remote data storage device, a data storage in a remote data center, or a cloud storage.

The network 128 is implemented by one or more physical network components, such as, but without limitation, routers, switches, network interface cards (NICs), and other network devices. The network 128 is any type of network for enabling communications with remote computing devices, such as, but not limited to, a local area network (LAN), a subnet, a wide area network (WAN), a wireless (Wi-Fi) network, or any other type of network. In this example, the network 128 is a WAN, such as the Internet. However, in other examples, the network 128 is a local or private LAN.

The user device 124 represents any device executing computer-executable instructions. The user device 124 can be implemented as a mobile computing device, such as, but not limited to, a wearable computing device, a mobile telephone, laptop, tablet, computing pad, netbook, gaming device, and/or any other portable device. The user device 124 includes at least one processor and a memory. The user device 124 can also include a user interface component. In some examples, the user device 124 is an RFID module and/or the user interface device 190 as described in greater detail in the description of FIG. 2 below.

The scanner 122 is a device configured to scan RFID tags. In some examples, the scanner 122 is an RFID module that acquires data by scanning RFID tags in a particular area and transmits the acquired data to the computing device 102, for example via the communications component 112. In other examples, the scanner 122 is a user equipment (UE) device or coupled to a UE device that includes an RFID reader. The scanner 122 can be implemented as a hand-held scanner device, such as a wand or module. The scanner 122, in other non-limiting examples, can be implemented as a mounted or fixed scanner device, such as, but not limited to, a scanner mounted to a ceiling, post, shelving, or other fixture. The scanner 122 can alternatively be referred to as an RFID tag reader. The scanner 122 will be described in greater detail below.

The scanner 122, in some examples, is a hand-held scanner device operated by a human user. In these examples, the user moves throughout the scanning area while operating the scanner device to detect RFID tags within the range of the scanner. In other examples, the scanner 122 is incorporated into a robotic device which is capable of self-navigating through the scan area. In these examples, the scanner gathers RFID tag data as the robotic device maneuvers through the scanning area. The robotic device can include a robotic device on wheels which moves along the ground, a device capable of floating or moving through water, as well as an aerial drone device.

In still other examples, one or more scanner devices are mounted to a fixture, display, ceiling, wall, post, portion of a display or other object. In these examples, the scanner device gathers RFID tag data from RFID tags within the scan radius of each of the fixed/mounted scanner devices.

The scanner 122, in some examples, is located within a retail environment. The retail environment can include a brick-and-mortar store, an order fulfillment center, a distribution center, or any other retail environment. However, the examples are not limited to a retail environment. In other examples, the scanner 122 is located within any area including RFID tagged elements. An RFID tagged element can include an animal, plant, or a non-living item.

The memory 104, in some examples, stores an error correction component 107 which is executed by the processor to perform operations on the computing device 102. The error correction component 107 is a software component or application which utilizes RFID tag data associated with items and locations to identify the location of items within a scan zone/scanning area. The error correction component 107, in some non-limiting examples, can be downloaded onto the computing device 102 via the network 128.

The error correction component 107, in some examples, receives/obtains RFID tag data from the plurality of RFID tags. The error correction component 107 analyzes a set of signal properties 134 of received radiofrequency identification (RFID) tag data 132 obtained from a plurality of RFID tags 130 within a scan zone associated with at least one scanner. The set of signal properties 134 includes one or more properties of a received RFID signal. The signal properties 134 included in the set of signal properties 134 can include, but is not limited to, one or more of a signal strength, a range, and a frequency. The scan zone can also be referred to as a scanning area, a detection area, or a detection zone. The scan zone is the area, or radius, within which an RFID tag reader, such as the scanner 122, can detect and receive signals data from a plurality of RFID tags 130. The plurality of RFID tags 130 within the scan zone are read by the scanner 122. Each of the plurality of RFID tags 130 include RFID tag data 132 that includes a location tag associated with at least a portion of a display and an item tag associated with an item.

In some examples, the error correction component 107 identifies, based on the analyzed signal properties 134 associated with the received RFID tag data 132, a set of item tags that are within a threshold range of the location tag. The set of item tags include the plurality of RFID tags 130 scanned by the scanner. As described in greater detail below, the plurality of RFID tags 130 can include the RFID tags 221-226 and 241-246. Each RFID tag of the plurality of RFID tags 130 includes the RFID tag data 116, which further includes item tag data 118 and location tag data 120. As described above, the analyzed signal properties 134 include, but are not limited to, one or more of a signal strength, a range, and a frequency of the received signal. The threshold range is a user-configured radius/range/area around a location tag, for example an RFID tag indicating a particular location such as the location A 210 or the location B 230 described in greater detail below.

In some examples, the error correction component 107 associates a set of items corresponding to the identified set of item tags with a predetermined location assigned to the location tag. The set of items can include the items 211-216 and the items 231-236 that correspond to the RFID tags 221-226 and 241-246, respectively. The predetermined location can be the location A 210 or the location B 230, described in greater detail below, which is indicated by the location tag data 120 stored in the data storage device 114.

In some examples, the error correction component 107 verifies the predetermined location is an assigned item location for the set of items. Verifying the predetermined location is the assigned item location for the set of items includes matching the received data from the plurality of RFID tags 130 to the RFID tag data 116 stored in the data storage device 114. In response to the received data from the plurality of RFID tags 130 matching the RFID tag data 116, the error correction component 107 verifies the expected location of the item(s) is the predetermined location. In other words, the system verifies the item(s) are located in the correct or expected area within a store, warehouse, DC, or other area. In response to the received data from the plurality of RFID tags 130 not matching the RFID tag data 116, the error correction component 107 does not verify the predetermined location.

In some examples, the error correction component 107 updates, in a data store, item location data 138 associated with the set of items with the predetermined location in response to failing to verify the predetermined location is the assigned item location. For example, the error correction component 107 can control to update information corresponding to the location tag data 120 for a particular RFID tag such that the location tag data 120 indicates the correct location for the particular RFID tag. In other words, if the current location of one or more items calculated based on the location RFID tag data is different than the expected location of the one or more items, the item location data 138 is updated to reflect the actual current location. In these examples, the location data for an item is updated to the predetermined location of the location tag within proximity of the item.

In other examples, the location data can be updated to include the calculated current location of the item, the assigned location where the item is supposed to be located, and the date/time at which the item was determined to be in the current location (predetermined location of the location tag) rather than in the expected (assigned) location. In this manner, the system can track/monitor both the current location of items, time at which the items were identified in their current location as well as the assigned location where the items are supposed to be located. If the current location is the same as the assigned/expected location, the system can update the location data for the item to include a verification that the item has been verified to be located in the correct location at the date/time when the scan data was generated.

In some examples, an alert can be output to the user interface 110, to a user interface of the user device 124 described herein, and/or a user interface of the scanner 122 described herein in response to the error correction component failing to verify the predetermined location. The alert can request corrective action to place the at least one of the identified set of item tags within the threshold range of the location tag or request corrective action to place an item corresponding to the extraneous item tag outside of the threshold range of the location tag.

The error correction component 107, in some examples, generates error correction data 136 based on the analyzed RFID tag data. The error correction data 136 includes data associated with the correct/assigned location of each item, the current calculated location of each item determined based on the analyzed signal properties, and/or instructions for correcting errors in the locations of items. The error corrections can include moving an incorrectly located item from the current location of the item to the correct assigned location of the item within the store, warehouse, DC, or other facility. In these examples, an alert or notification can be output to one or more users via one or more user interface devices instructing the user(s) to move the incorrectly placed item(s) from the current location of the item(s) to the correct, assigned location(s).

The error correction data 136, in other examples, can include instructions for updating the location of the item in a data store, such as, but not limited to, a database, cloud storage or local data storage device. The error correction component, in these examples, updates the location data to reflect the identification of each item, the assigned location for each item, identification of items which are verified to be located in the correct location, identification of items which are in an incorrect current location, time/date at which the current location is calculated and/or identification of item(s) which should be moved/relocated to a different location.

The error correction data 136, in other examples, can include instructions for moving one or more other items to one or more other locations to compensate for the current location of the incorrectly placed items. For example, if a dozen shirts have been placed on a first rack assigned to jackets, the error correction data may include instructions for placing the jackets on a different second rack and allowing the misplaced shirts to remain on the first rack. In this way, the system mitigates time and expense involved in moving items by reassigning the locations of other items to reduce the number of items which have to be manually relocated by users.

In this example, the error correction component 107 is executed on the computing device 102. In other non-limiting examples, the error correction component 107 is executed in whole or in part by a cloud server. In other words, the cloud server may perform the RFID tag analysis, verification and updating of the item location data 138. In other examples, the cloud server may perform the analysis while the error correction component 107 on the computing device performs the verification and updating. Likewise, the verification may be performed by the cloud server while the updating is performed on the computing device. RFID tag data may be analyzed in the cloud server while the location verification is performed on the computing device 102 and the updating occurs on a cloud storage, etc.

The cloud server is a logical server providing services to the computing device 102 or other clients, such as, but not limited to, the user device 124. In some non-limiting examples, the cloud server is associated with one or more physical servers in one or more data centers. In other examples, the cloud server is associated with a distributed network of servers.

Figure 2:
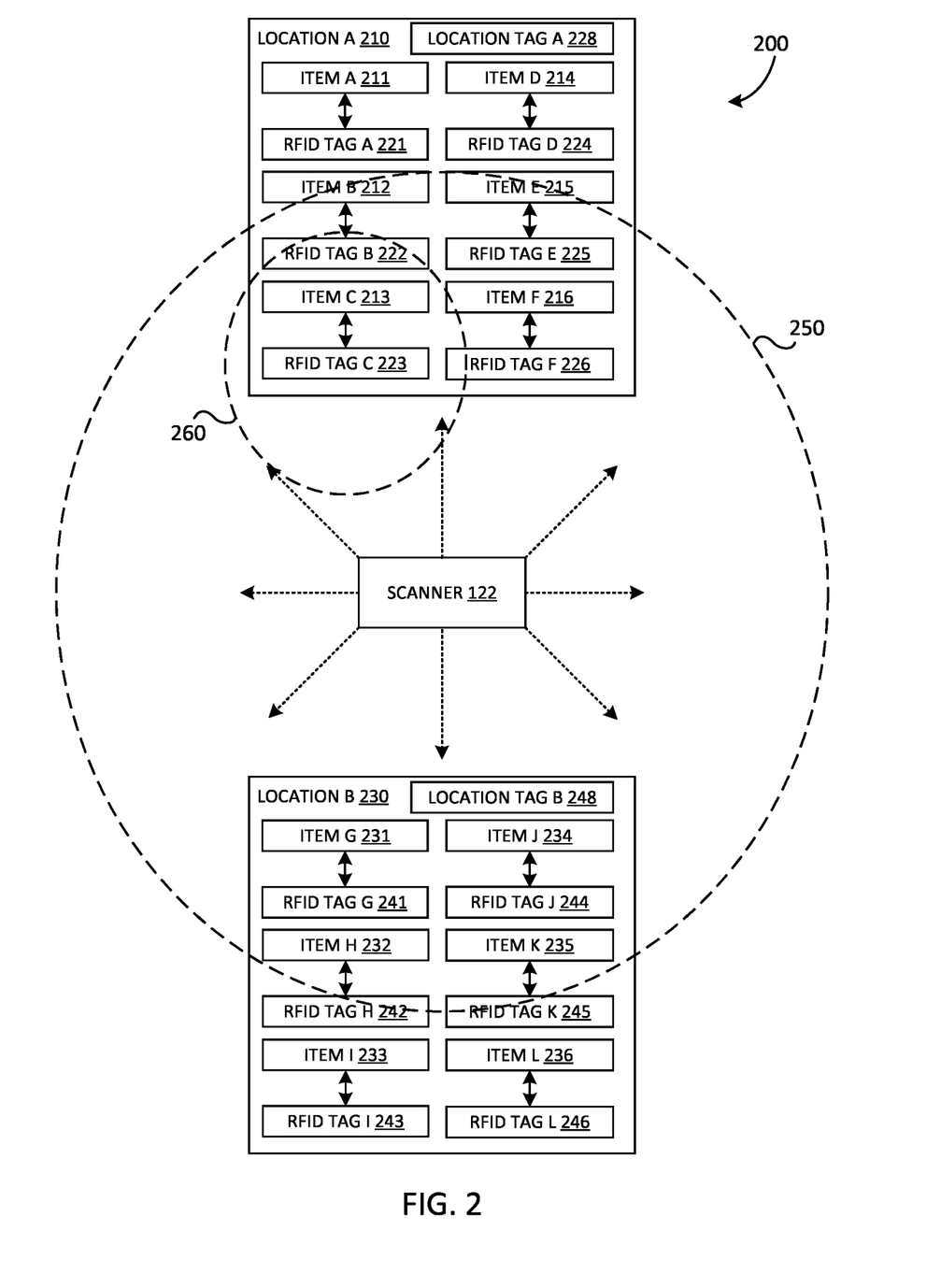
FIG. 2 is an exemplary block diagram illustrating a system for error correction using RFID signals.

FIG. 2 is an exemplary block diagram illustrating a system for error correction using RFID signals. The system 200 illustrated in FIG. 2 is not drawn to scale and is provided for illustration only. Other examples of the system 200 can be used without departing from the scope of the present disclosure.

The system 200 includes a location A 210, a location B 230, and the scanner 122. The location A 210 and the location B 230 can be identified by RFID tag data 116, which include location tag data 120 as described in the description of FIG. 1 above. For example, the scanner 122 can receive a signal from an RFID location tag A 228 corresponding to the location A 210, which the computing device 102 can analyze and determine that RFID tags corresponding to particular items are near, proximate to, surrounding, and so forth the RFID tag of the location A 210. Likewise, the scanner 122 can receive a signal from an RFID location tag B 248 corresponding to the location B 230, which the computing device 102 can analyze and determine that RFID tags corresponding to particular items are near, proximate to, surrounding, and so forth the RFID tag of the location B 230.

The location A 210 includes the location tag A 228, a set of items, and a set of corresponding item RFID tags. For example, the location A 210 includes item A 211, item B 212, item C 213, item D 214, item E 215, and item F 216, The location A 210 further includes an RFID tag A 221 corresponding to the item A 211, an RFID tag B 222 corresponding to the item B 212, an RFID tag C 223 corresponding to the item C 213, an RFID tag D 224 corresponding to the item D 214, an RFID tag E 225 corresponding to the item E 215, and an RFID tag F 226 corresponding to the item F 216. Similarly, the location B 230 includes the location tag B 248, a set of items, and a set of corresponding item RFID tags. For example, the location B 230 includes item G 231, item H 232, item I 233, item J 234, item K 235, and item L 236, The location B 230 further includes an RFID tag G 241 corresponding to the item G 231, an RFID tag H 242 corresponding to the item H 232, an RFID tag I 243 corresponding to the item I 233, an RFID tag J 244 corresponding to the item J 234, an RFID tag K 245 corresponding to the item K 235, and an RFID tag L 246 corresponding to the item L 236.

In some examples, the plurality of RFID tags 130 read by the scanner 122 includes the RFID tags 221-226 and 241-246 illustrated in FIG. 2 and the data storage device 114 stores RFID tag data 116 for each of the RFID tags 221-226 and 241-246. For example, each of the RFID tags 221-226 and 241-246 includes the item tag data 118 and location tag data 120 stored in the data storage device 114. The scanner 122 scans the plurality of RFID tags 130 and acquires the RFID tag data 132 from each of the plurality of RFID tags 130. As described herein, when the acquired RFID tag data 132 matches the stored RFID tag data 116 for a particular RFID tag, the item corresponding to the particular RFID tag is verified. In other words, the RFID tags 221-226 correspond to a particular, predetermined sub-location in the location A 210 and the RFID tags 241-246 correspond to and are physically fixed to a particular, predetermined sub-location in the location B 230. The sub-location can be a display at the predetermined sub-location, such as a rack, shelf, cubby, end-cap display, standalone display, tote, box, pallet, cart, buggy, or any other container that can be placed at a particular location and store and/or display items. In some examples, the display is fixed and not feasibly movable day to day. In other examples, the display is not fixed and moving the display day to day is feasible. In examples where the display is moved, the location data corresponding to the RFID tag of the display is updated to reflect the new location of the display. For example, the location tag data 120 of the RFID tag 221-226 or 241-246 is updated to reflect the updated position of the RFID tag within the location A 210 or B 230, respectively.

In some examples, the set of items 211-216 are a variable assortment of one or more items assigned to a display in the location A 210 and the set of items 231-236 are a changing assortment of one or more items assigned to a display in the location B 230. In other words, the particular item, identified by a model number, SKU, and so forth, corresponding to item A 211, item B 212, and so forth, can change day to day, week to week, or month to month. In some examples, each item 211-216 and 231-236 is a single item. In some examples, each item 211-216 and 231-236 refers to multiple items.

As described herein, the scanner 122 is configured to scan an area 250 that can include one or more RFID tags 221-226 and RFID tags 241-246. In some examples, the scanner 122 is portable such that the scan area 250 can move based on the location of the scanner 122. For example, as illustrated in FIG. 2, the scan area 250 includes the RFID tag B 222, RFID tag C 223, RFID tag E 225, RFID tag F 226, RFID tag G 241, and RFID tag J 244. However, the scan area 250 is for illustration only and can be moved to include more or fewer RFID tags than the ones illustrated as within the scan area 250 in FIG. 2. During the scan of the scan area 250, the scanner 122 receives signals from the RFID tags within the scan area. The received signals include various signal properties 134, including but not limited to a signal strength, a range, and a frequency. The properties of each signal can be different. For example, as shown in FIG. 2, the signal strength of the signal received from the RFID tag C 223 can be expected to be greater than the signal strength of the signal received from the RFID tag B 222 because the RFID tag C 223 is closer in proximity to the scanner than the RFID tag B 222. As another example, RFID tag H 242 and RFID tag K 245 are both partially within the scan area 250. The signal data received by the scanner 122 from the RFID tag H 242 and RFID tag K 245 can include a signal of decreased strength or decreased range, indicating the RFID tag H 242 and RFID tag K 245 are partially in range of the scanner 122 but not close enough in proximity for the scanner 122 to receive a strong signal.

In some examples, each RFID tag 221-226 and 241-246 includes a threshold range 260. As illustrated in FIG. 2, the threshold range 260 is the threshold range for the particular RFID tag C 223. For simplicity of description, only the threshold range 260 for the RFID tag C 223 is illustrated in FIG. 2 but it should be understood that each individual RFID tag 221-226 and 241-246 includes a threshold range. The threshold range 260 is a maximum range from the RFID tag C 223 from which RFID tag C 223 can be accurately detected. In some examples, the threshold range is a user-configured radius/range/area around a location tag, for example an RFID tag indicating a particular location such as the location A 210 or the location B 230. As illustrated in FIG. 2, the threshold range 260 of the RFID tag C 223 overlaps the scan area 250 of the scanner 122, indicating that the location tag data 120 and item tag data 118 of the RFID tag C 223 are received by the scanner 122 for analysis by the processor 108, described in greater detail below. As described above, the RFID tag H 242 and RFID tag K 245 are partially in range of the scanner 122. Accordingly, the respective threshold ranges of the RFID tag H 242 and RFID tag K 245 have less overlap with the scan area 250 than the threshold range of an RFID tag, such as the RFID tag C 223, which fully overlaps with the scan area 250.

As described herein, each RFID tag includes location tag data 120. For example, the RFID tag B 222, RFID tag C 223, RFID tag E 225, and RFID tag F 226 each include location tag data 120 indicating the predetermined position of each RFID tag within the location A 210 and the RFID tag G 241 and RFID tag J 244 each include location tag data 120 indicating the predetermined position of each RFID tag within the location B 230.

Various examples of the present disclosure enable the verification of particular items within the correct location based on the retrieved location data of particular RFID tags by the scanner 122. Further examples of the present disclosure take into account that in some instances, particular items within a location cannot be verified as correctly placed and/or are determined to be incorrectly placed and, accordingly, provide systems and methods that update location data of particular items so that the incorrectly located items can be restored to the proper location.

Figure 3:
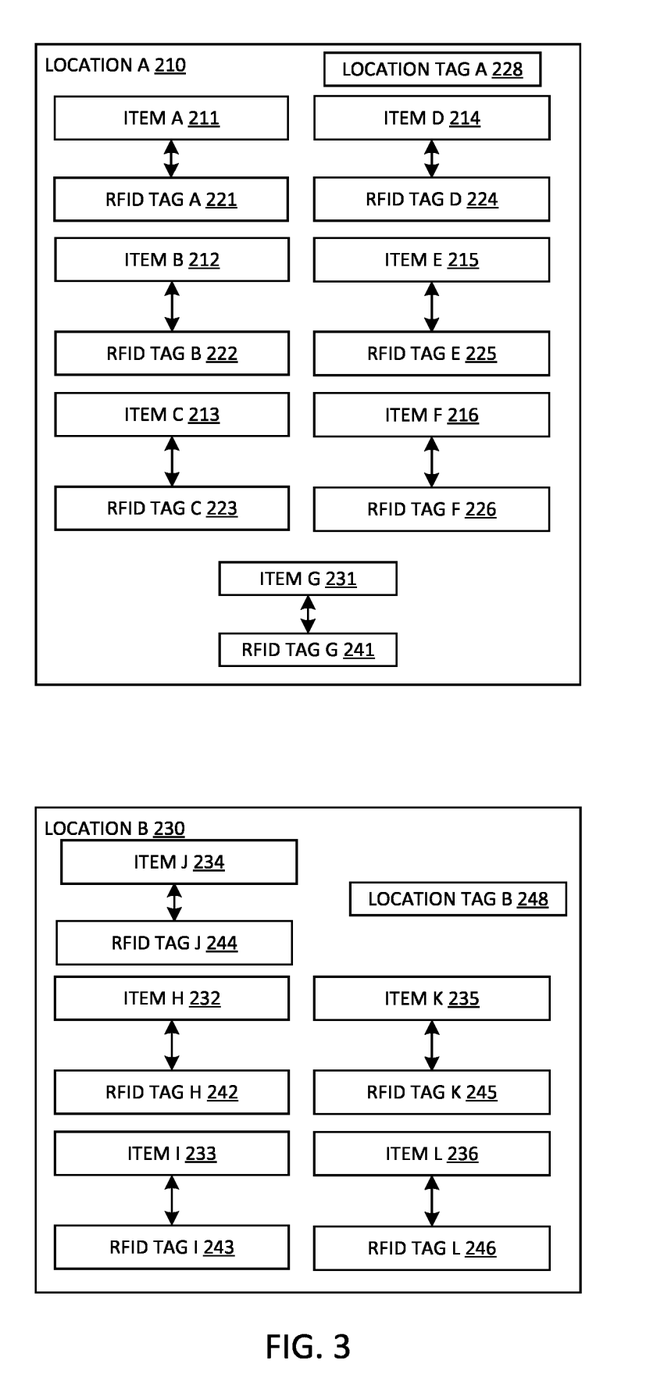
FIG. 3 is an exemplary block diagram illustrating a scenario where an additional item is present in a location for which it is not tagged.

For example, FIG. 3 is an exemplary block diagram illustrating a scenario where an additional item is present in a location for which it is not tagged. More particularly, FIG. 3 illustrates the item G 231 improperly located in the location A 210. The improper location of an item illustrated in FIG. 3 is for illustration only. Other examples of an improper location of an item can be used without departing from the scope of the present disclosure.

As shown in FIG. 3, the item G 231 and the corresponding RFID tag G 241 are improperly located within the location A 210. As illustrated in FIG. 2 and described above, the item G 231 and the corresponding RFID tag G 241 are assigned to the location B 230. Accordingly, during a scan of the scan area 250 including the location A 210, the scanner 122 receives a signal from the RFID tag G 241 in the location A 210. During the analysis of the received scan data, rather than verifying the location A 210 as the assigned location for the item G 231, the processor 108 identifies the item G 231 as an extraneous item tag within the location A 210. In other words, item G 231 is an additional item present in a location for which it is not assigned or tagged. In some examples, an extraneous item tag is an item that is not associated with a particular location but identified in the location, nonetheless. In various examples, the extraneous item is also referred to as an out of place item, an improperly located item, a misplaced item, and so forth. In response to identifying the extraneous item within the location A 210, the computing device 102 outputs an alert requesting corrective action to place the extraneous item outside of the location A 210. For example, the processor 108 can control the communications component 112 to output a notification or an alert, such as to the user device 124, requesting corrective action be taken to remove the extraneous item. The corrective action can be taken by a user, such as the user 126, a robot, an electronic device, or any other suitable entity capable of removing the item. The alert can be output to the user interface 110, an external device such as the user device 124, or any other suitable output without departing from the scope of the present disclosure.

Figure 4:
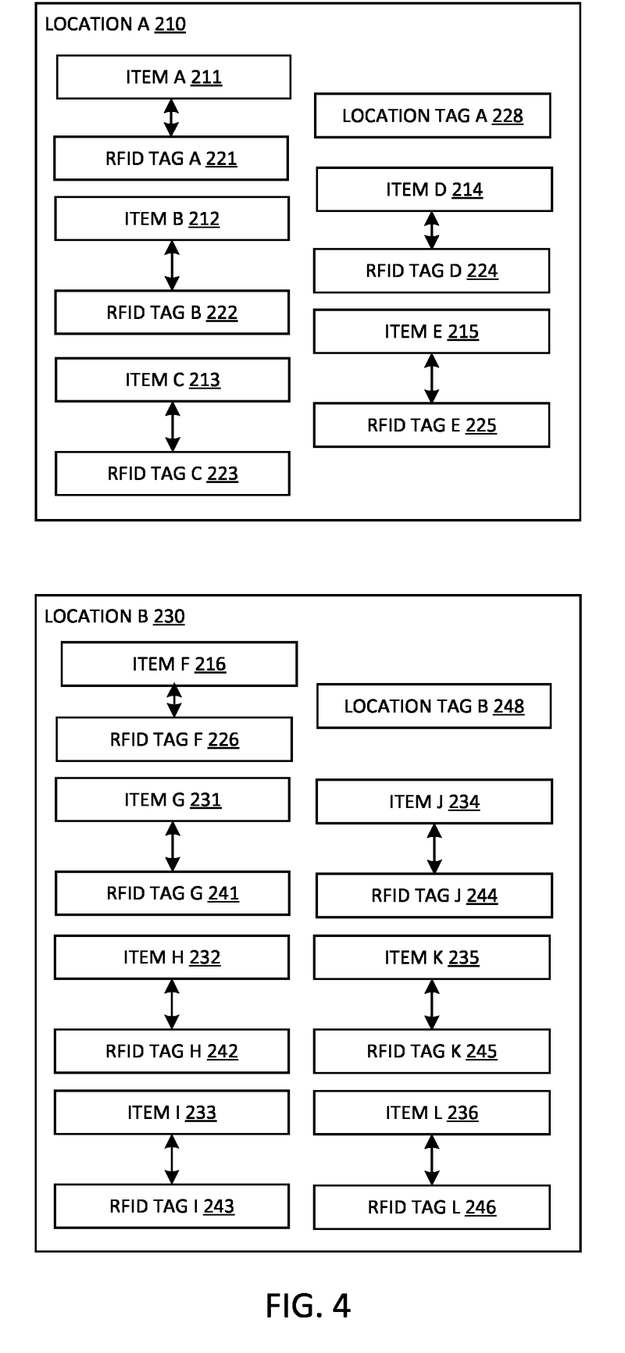
FIG. 4 is an exemplary block diagram illustrating a scenario where an item is not present in an assigned location.

Referring now to FIG. 4, an exemplary block diagram illustrating a scenario where an item is not present in an assigned location is shown. More particularly, FIG. 4 illustrates the item F 216 outside of the assigned location A 210. The improper location of the item F 216 illustrated in FIG. 4 is for illustration only. Other examples of an improper location of an item can be used without departing from the scope of the present disclosure.

As shown in FIG. 4, the item F 216 and the corresponding RFID tag F 226 are improperly located outside of the location A 210. As illustrated in FIG. 2 and described above, the item F 216 and the corresponding RFID tag F 226 are assigned to the location A 210. Accordingly, during a scan of the scan area 250 including the location A 210, the scanner 122 does not receive a signal from the RFID tag F 226 in the location A 210, which would identify the item F 216 as being in the assigned location A 210. During the analysis of the received scan data, rather than verifying the presence of the RFID tag F 226 in the location A 210, the processor 108 identifies the RFID tag F 226 is outside of the location A 210. In other words, item F 216 is an item that is not present in its assigned location of location A 210. In some examples, the processor 108 identifies the RFID tag F 226 as a missing item tag. In various examples, a missing item tag is also referred to as a misplaced item tag, a lost item tag, an absent item tag, and so forth. In response to identifying the missing item tag, the computing device 102 outputs an alert requesting corrective action to find the missing item tag and place the missing item tag, and the corresponding item, within the threshold range of the location. For example, the processor 108 can control the communications component 112 to output a notification or an alert, such as to the user device 124, requesting corrective action be taken to find the missing item tag and place the missing item tag, and the corresponding item, within the threshold range of the location. The corrective action can be taken by a user, such as the user 126, a robot, an electronic device, or any other suitable entity capable of finding and placing the missing item tag, and the corresponding item, in the correct, assigned location A 210. The alert can be output to the user interface 110, an external device such as the user device 124, or any other suitable output without departing from the scope of the present disclosure.

As part of the analysis of the scan data, the computing device 102 analyzes the scan data to match the RFID tags assigned to the location A 210 identify that the RFID tag F 226 is not in the assigned location. The assignments of the RFID tags to particular locations can be stored in a database stored in the data storage device 114. In some examples, the computing device 102 performs additional analysis to identify a cause for the RFID tag F 226 to not be present in the assigned location A 210. For example, the item F 216 can be an item for sale, and the computing device 102 can check sales records to determine whether the item F 216 has been sold and is no longer for sale in the location A 210. As another example, the computing device 102 can check a reassignment queue to determine whether the item F 216 has been reassigned to another location. If the item F 216 has been reassigned, the computing device 102 updates the assigned locations for the RFID tag F 226, and accordingly the item F 216, in the data storage device 114. In some examples, updating the assigned location includes an additional analysis of the scan data to confirm the RFID tag F 226 is located in the newly assigned location prior to updating the assigned location in the database stored in the data storage device 114.

In some examples, a missing item tag can be located, or found, by conducting additional scans of different scan areas 250. In the example illustrated in FIG. 4, a scan of the scan area 250 corresponding to the location B 230 indicates the presence of the RFID tag F 226 and, accordingly, the item F 216, in the location B 230. In the example illustrated in FIG. 4, additional scans can be conducted by the scanner 122 that, when analyzed by the computing device 102, indicate that the RFID tag F 226 is present in a non-assigned location B 230. In this example, an output alert can instructions indicating the actual location of the RFID tag F 226, and the corresponding item F 216, and include on the correct location A 210 of the RFID tag F 226 and the corresponding item F 216 to which the RFID tag F 226 and the corresponding item F 216 are to be returned.

Figure 5:
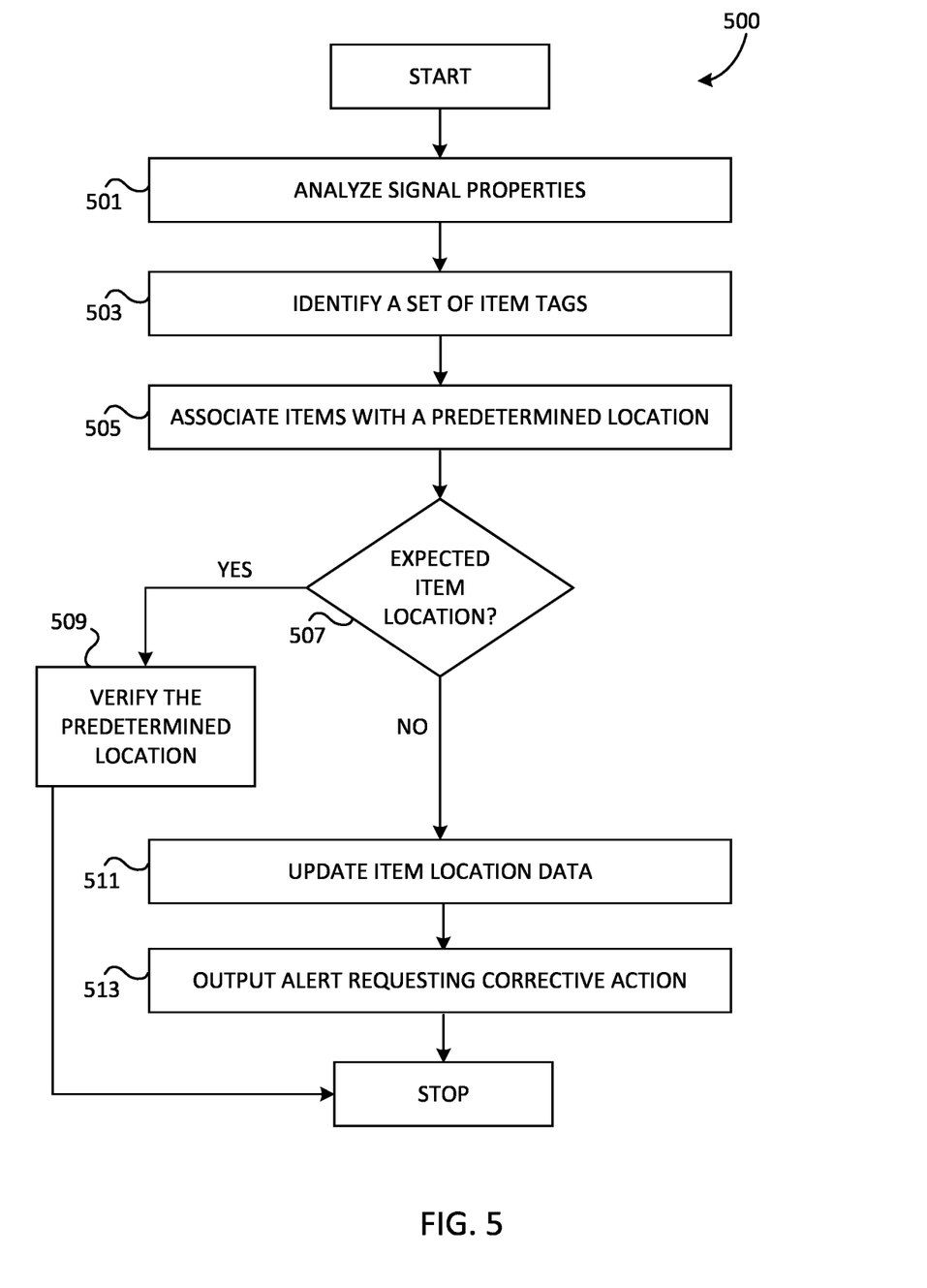
FIG. 5 is an exemplary flow chart illustrating operation of a computing device to correct errors using combination RFID signals.

FIG. 5 is an exemplary flow chart illustrating operation of a computing device to correct errors using combination RFID signals. The method 500 can be implemented by one or more elements of the system 100, such as the computing device 102 and the scanner 122. The method 500 is provided for illustration only. Other examples of the method 500 can be used without departing from the scope of the present disclosure.

The process begins by analyzing signal properties 134 of received RFID tag data 132 received from a plurality of RFID tags 130 at 501. For example, the scanner 122 receives RFID data from RFID tags 221-226, RFID tags 241-246, and RFID tags corresponding to the location A 210 and the location B 230. As described herein, each of the RFID tags includes a location tag that includes location data that is associated with at least a portion of a display and a set of item tags associated with a set of items. For example, the RFID tag A 221 includes location tag data 120 that is associated with at least a portion of a display within the range of the location A 210 and includes item tag data 118 that is associated with the item A 211. The RFID data scanned by the scanner 122 is transmitted to the computing device, which receives the location tag data 120 and the item tag data 118 via the communications component 112.

In some examples, the signal properties 134 include various tangible properties of the RFID signals. For example, the signal properties 134 can include, but are not limited to, one or more of a signal strength of the signal of the received RFID tag data, a range of the signal of the received RFID tag data, and a frequency of the signal of the received RFID tag data. The signal strength of the signal can be used to indicate a distance of the RFID tag from the scanner. For example, a stronger signal indicates a closer proximity of the RFID tag to the scanner 122 than a weaker signal.

The computing device 102 identifies, based on the analyzed signal properties 134 associated with the received RFID tag data, a set of item tags that are within a threshold range of the location tag at 503. For example, the computing device 102 can identify a set of RFID tags, such as the RFID tags 221-226, are within a threshold range of the based on the analysis of the signal properties 134 indicating that each of the RIFD tags 221-226 are within the threshold range of the location A 210. In other examples, such as illustrated in FIG. 4, the computing device 102 can identify that some RFID tags are within the threshold range of the location A 210 while identifying some RFID tags that are not within the threshold range.

The computing device 102 associates a set of items corresponding to the identified set of item tags with a predetermined location assigned to the location tag at 505. For example, the data storage device 114 can store a database including associations between RFID tags, items, and predetermined locations. The processor 108 can access the database in the data storage device 114 and, using the identified set of item tags, match the items corresponding to the identified set of item tags identified in the threshold range of the location identified by the location tag data 120 of the location A 210. By matching the item tags to items at a location, the processor 108 identifies the items that are present at the location A 210. For example, the set of item tags can include the RFID tag A 221. The processor 108 can access the database stored in the data storage device 114 and identify the item A 211 as the item associated with the particular RFID tag A 221 to match the item A 211 to the RFID tag A 221. The processor 108 identifies each item associated with each RFID tag of the set of item tags identified within the threshold range of the location identified by the location tag data 120.

The computing device 102 determines whether the identified location of the associated item is the correct location for each item at 507. For example, the computing device 102 can determine that data from the RFID tag A 221 was detected within the threshold range for the location identified by the location tag data 120 of the location A 210, match this item A 211 to the location A 210 in the database in the data storage device 114, and therefore confirm, or verify, the item A 211 is in the correct, predetermined location at 509. The verification, or a notification indicating the verification, can be output to the user interface 110, an external device such as the user device 124, or any other suitable output.

Where the computing device 102 determines the item is not in the expected item location or the computing device 102 is unable to make a determination based on the analysis of the signal properties 134 of the received tag data 132, the computing device 102 updates stored item location data 138 associated with the set of items that are not determined to be in the expected item location at 511. For example, the location data of an item and RFID tag determined to be in the incorrect location can be updated in the database stored in the data storage device 114.

In examples where the computing device 102 determines the item is not in the expected item location or the computing device 102 is unable to make a determination based on the analysis of the signal properties 134 of the received tag data 132, the computing device 102 further outputs an alert requesting corrective action at 513. As illustrated in FIG. 4, the computing device 102 can identify that at least one of the identified item tags, which is assigned to the location A 210, is outside of the threshold range of the location tag associated with the location A 210 and output an alert requesting corrective action to move the at least one of the identified item tag from the incorrect location to the correct location within the threshold range of the location identified by the location tag data 120 of the location A 210. In another example, as illustrated in FIG. 3, the computing device 102 can identify an extraneous item tag within the threshold range of the location identified by the location tag data 120, indicating an item within the location A 210 that is not assigned to or associated with the location A 210, and output an alert requesting corrective action to move the at least one identified item tag from the incorrect location within the threshold range of the location identified by the location tag data 120 of the location A 210 to the correct location. As described herein, the alert requesting correction action can be output to the user interface 110, an external device such as the user device 124, or any other suitable output without departing from the scope of the present disclosure. The corrective action can then be taken by a user, such as the user 126, a robot, an electronic device, or any other suitable entity capable of removing the item.

In some examples, the computing device 102 updates the item location data at 511 and outputs an alert requesting the corrective action at 513 in any order. For example, the computing device 102 can output the alert requesting corrective action, update the item location data to reflect the current location in the interim until the corrective action has occurred, and re-update the item location to reflect the expected item location once a notification that the corrective action has been completed is received. In this example, although two updates to the item location are performed, the location of the item and/or the item tag are correct and the item and/or item tag can be more precisely tracked.

In some examples, the set of items is a first set of items within a plurality of items and the location tag is a first location identified by the location tag location identified by the 120 associated with a first display. As described herein, the display can be any one of a rack, shelf, cubby, end-cap display, standalone display, tote, box, pallet, cart, buggy, or any other container that can be placed at a particular location and store and/or display items. In some examples, the computing device 102 further identifies a second set of items located outside the threshold range of the first location identified by the location tag data 120. The second set of items includes items that are close enough in proximity to the scanner 122 to be detected, but outside the threshold range that corresponds to the location A 210. The second set of items can, in some examples, include one or more of the items 231-236 illustrated in FIG. 2. The computing device 102 can identify a second location tag that is associated with a second display, for example a location tag identified by the location tag data 120 corresponding to the location B 230. The second set of items are within range of the second location tag associated with the second display in location B 230. Based on the identification of the second set of items and the second location tag, the computing device 102 assigns a second predetermined location of the second display to the second set of items. The assignation of the second predetermined location to the second set of items is stored in the database of the data storage device 114.

By way of example and not limitation, computer readable media comprise computer storage media and communication media can be implemented in one or more examples, such as by the processor 108. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Additional Examples

In an example scenario, a user utilizes an RFID tag reader wand to manually scan groups of items within a scan zone. The RFID tag data obtained by the RFID tag reader includes RFID tag data from item tags and location tags. The RFID tag reader transmits the RFID tag data to a computing device or cloud server. An error correction component analyzes the RFID tag data to identify a current location of each item within the scan zone based on the predetermined location of each location tag. The error correction component compares the current location of each item with the expected location of each item. If the current location matches the expected location, the system updates the location data for the item(s) with a location verification indicating the location of the item(s) has been verified as correct. If the current location is different than the expected location, the error correction component updates the location data for each item to reflect the current location and the time/date at which the item was identified at that location. The error correction component optionally outputs a notification to a user device notifying a user that the item(s) location has been verified as correct. The notification in other examples includes an identification of item(s) in an incorrect location. The notification can optionally include an instruction to one or more users to move the items from the current location to a different location presented to the user via a user interface device. The error correction component can then receive updated RFID tag data associated with the item(s) after the items are moved to the different location. The error correction component analyzes this updated RFID tag data to verify the item(s) are now located in the correct/expected location. The item location data is updated again to reflect the new location of the item(s) after the user(s) have relocated the items in response to the notification presented to the user via the user device.

Alternatively, or in addition to the other examples described herein, examples include any combination of the following:

analyzing a set of signal properties of received radiofrequency identification (RFID) tag data obtained from a plurality of RFID tags within a scan zone associated with at least one scanner, the plurality of RFID tags comprising a location tag associated with at least a portion of a display and a set of item tags associated with a set of items;

identifying, based on the analyzed signal properties associated with the received RFID tag data, a set of item tags that are within a threshold range of the location tag;

associating a set of items corresponding to the identified set of item tags with a predetermined location assigned to the location tag;

verifying the predetermined location is an assigned item location for the set of items;

updating, in a data store, item location data associated with the set of items with the predetermined location in response to failing to verify the predetermined location is the assigned item location;

identifying that at least one of the identified set of item tags is outside the threshold range of the location tag;

outputting an alert requesting corrective action to place the at least one of the identified set of item tags within the threshold range of the location tag;

identifying an extraneous item tag within the threshold range of the location tag, wherein the extraneous item tag is not associated with the predetermined location;

outputting an alert requesting corrective action to place an item corresponding to the extraneous item tag outside of the threshold range of the location tag;

analyzing the signal properties to determine at least one of a signal strength of a signal of the received RFID tag data, a range of the signal of the received RFID tag data, or a frequency of the signal of the received RFID tag data;

the set of items is a first set of items within a plurality of items and the location tag is a first location tag associated with a first display;

identifying a second set of items located outside the threshold range of the first location tag;

identifying a second location tag associated with a second display, wherein the second set of items are within range of the second location tag;

assigning a second predetermined location of the second display to the second set of items;

matching the identified set of item tags to stored item data corresponding to the assigned, predetermined location;

verifying, based on the matching, the predetermined location is the assigned item location;

outputting an indication of the verification to a user interface (UI); and the threshold range is a maximum range from the location tag that the set of items is accurately detected.

As indicated above, program code instructions may be stored in memory, and executed by processing circuitry that is thereby programmed, to implement functions of the systems, subsystems, tools, and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded, and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitry s which perform the specified functions, or combinations of special purpose hardware and program code instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A system, comprising:
   a processor; and
   a memory communicatively coupled to the processor and having stored thereon computer-executable instructions causing the processor to:
   receive, by a central computing device, radio frequency identification (RFID) tag data gathered by a robotic device maneuvering across a sales floor of a retail facility, the RFID tag data including signal strengths of RFID item tags and a signal strength of an RFID location tag, wherein the RFID item tags identify apparel items offered for sale on the sales floor and the RFID location tag identifies a location on the sales floor, the RFID location tag being separate from the RFID item tags;
   analyze, by the central computing device, a combination of the signal strengths of the RFID item tags and the signal strength of the RFID location tag to identify a set of RFID item tags that are located within a threshold range of the RFID location tag;
   determine, by the central computing device, that a set of the apparel items identified by the set of RFID item tags includes an extraneous apparel item associated with an assigned location on the sales floor that is different than the location on the sales floor identified by the RFID location tag; and
   send a notification to the robotic device, the notification instructing the robotic device to move the extraneous apparel item from the location on the sales floor identified by the RFID location tag to the assigned location on the sales floor.

2. The system of claim 1, wherein the processor is further configured to:
   identify that at least one of the set of RFID item tags is outside the threshold range of the RFID location tag; and
   send a separate notification to the robotic device, the separate notification instructing the robotic device to alert requesting corrective action to place the extraneous apparel item within the threshold range of the RFID location tag.

3. The system of claim 1, wherein the processor is further configured to:
   output, to a user interface (UI), an indication of a verification that at least some items are assigned to the location on the sales floor identified by the RFID location tag.

4. The system of claim 1, wherein the central computing device identifies the set of RFID item tags that are located within the threshold range of the RFID location tag based on a combination of the signal strength of the RFID location tag and a signal strength of a given RFID item tag, in the set of RFID item tags, exceeding a threshold.

5. A computer-implemented method comprising:
   receiving, by a central computing device, radio frequency identification (RFID) tag data gathered by a robotic device maneuvering across a sales floor of a retail facility, the RFID tag data including signal strengths of RFID item tags and a signal strength of an RFID location tag, wherein the RFID item tags identify apparel items offered for sale on the sales floor and the RFID location tag identifies a location on the sales floor, the RFID location tag being separate from the RFID item tags;
   analyzing, by the central computing device, a combination of the signal strengths of the RFID item tags and the signal strength of the RFID location tag to identify a set of RFID item tags that are located within a threshold range of the RFID location tag;
   determining, by the central computing device, that a set of the apparel items identified by the set of RFID item tags includes an extraneous apparel item associated with an assigned location on the sales floor that is different than the location on the sales floor identified by the RFID location tag; and sending a notification to the robotic device, the notification instructing the robotic device to move the extraneous apparel item from the location on the sales floor identified by the RFID location tag to the assigned location on the sales floor.

6. The computer-implemented method of claim 5, further comprising:

identifying that at least one of the set of RFID item tags is outside the threshold range of the RFID location tag; and sending a separate notification to the robotic device, the separate notification instructing the robotic device to alert requesting corrective action to place the extraneous apparel item within the threshold range of the RFID location tag.

7. The computer-implemented method of claim 5, further comprising:

outputting, to a user interface (UI), an indication of a verification that at least some items are assigned to the location on the sales floor identified by the RFID location tag.

8. The computer-implemented method of claim 5, wherein the central computing device identifies the set of RFID item tags that are located within the threshold range of the RFID location tag based on a combination of the signal strength of the RFID location tag and a signal strength of a given RFID item tag, in the set of RFID item tags, exceeding a threshold.

9. One or more non-transitory computer storage media having computer-executable instructions that, when executed by a processor, cause the processor to:

receive, by a central computing device, radio frequency identification (RFID) tag data gathered by a robotic device maneuvering across a sales floor of a retail facility, the RFID tag data including signal strengths of RFID item tags and a signal strength of an RFID location tag, wherein the RFID item tags identify apparel items offered for sale on the sales floor and the RFID location tag identifies a location on the sales floor, the RFID location tag being separate from the RFID item tags;

analyze, by the central computing device, a combination of the signal strengths of the RFID item tags and the signal strength of the RFID location tag to identify a set of RFID item tags that are located within a threshold range of the RFID location tag;

determine, by the central computing device, that a set of the apparel items identified by the set of RFID item tags includes an extraneous apparel item associated with an assigned location on the sales floor that is different than the location on the sales floor identified by the RFID location tag; and send a notification to the robotic device, the notification instructing the robotic device to move the extraneous apparel item from the location on the sales floor identified by the RFID location tag to the assigned location on the sales floor.

10. The one or more non-transitory computer storage media of claim 9, further comprising:

identify that at least one of the set of RFID item tags is outside the threshold range of the RFID location tag; and send a separate notification to the robotic device, the separate notification instructing the robotic device to alert requesting corrective action to place the extraneous apparel item within the threshold range of the RFID location tag.

11. The one or more non-transitory computer storage media of claim 9, further comprising:

output, to a user interface (UI), an indication of a verification that at least some items are assigned to the location on the sales floor identified by the RFID location tag.

12. The one or more non-transitory computer storage media of claim 9, wherein the central computing device identifies the set of RFID item tags that are located within the threshold range of the RFID location tag based on a combination of the signal strength of the RFID location tag and a signal strength of a given RFID item tag, in the set of RFID item tags, exceeding a threshold.

* * * * *